Dec. 10, 1929.  J. O. BRUMBAUGH  1,738,690
END TRAIN PIPE VALVE
Filed Nov. 10, 1928

INVENTOR:
Jacob O. Brumbaugh,
By Attorneys,
Fraser, Myers & Manley

Patented Dec. 10, 1929

1,738,690

UNITED STATES PATENT OFFICE

JACOB O. BRUMBAUGH, OF NEW YORK, N. Y., ASSIGNOR TO GOLD CAR HEATING & LIGHTING COMPANY, OF NEW YORK, N. Y., A CORPORATION OF OHIO

END TRAIN-PIPE VALVE

Application filed November 10, 1928. Serial No. 318,370.

This invention relates to valves designed and adapted particularly for use at the ends of the steam pipes or train pipes of railway cars, whereby to shut off such pipe at the rear end of a train. Various constructions of such end train pipe valves have been made, the present invention providing an improved construction which better adapts the valve for its specific function.

The valve of this invention is shown in the accompanying drawings, wherein—

Figure 3:
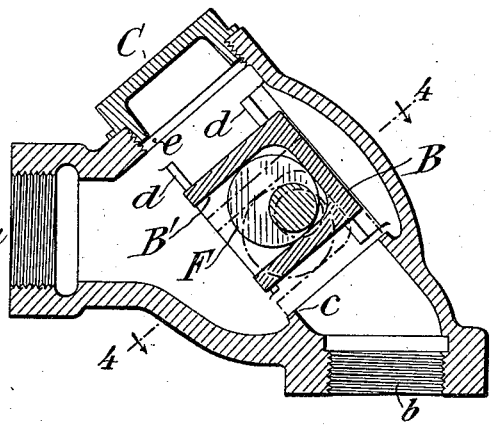
Fig. 3 is a vertical mid-section.
Figure 6:
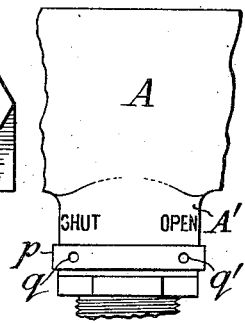
Fig. 6 is an oblique fragmentary view looking in the direction of the arrow 6 in Fig. 1.

The improved valve comprises an outer casing or shell A having an opening $a$ on a horizontal axis at one side for connection with the train pipe running underneath the car, and an opening $b$ at the bottom for connection through the usual nipple and bend with the hose to which is connected the hose coupling for engaging a mating coupling applied to the hose on the next car of the train. The casing has within it a valve seat $c$ against which closes a cylindrical valve B which is guided to move between internal guiding ribs $d$, $d$, formed within the casing, as best shown in cross-section, Fig. 4. The valve casing A is formed with an opening $e$ through which the valve B may be inserted or removed, which is closed by a cap C. The valve shell A is extended laterally by a neck A' (Fig. 2) which is bored through and fitted with a stuffing box D (Fig. 4), and through this stuffing box passes the operating spindle or valve stem E. The valve stem E passes through the chamber within the valve shell or casing, its opposite end $f$, which is concentric with the journal portion, turning within as a bearing in a cavity within the casing; and the stem carries an eccentric F which turns within a chamber B' (Fig. 3) in the cylindrical valve plunger B, so that as the spindle is turned about 90 degrees, the eccentric will move the valve plunger from its closed position against the seat $c$ to its open position shown in Fig. 3, or vice versa. These movements are communicated to the valve stem in any suitable way, commonly by a rod the end of which is fixed in one member $g$ of a universal joint G (Fig. 2) comprising an intermediate member $h$ and a member $i$, which latter is fixed on the squared portion of the spindle. The member $i$ has an arm $j$ projecting outwardly from it (its outline being that shown in dotted lines at $j'$ in Fig. 2), and from this arm projects an arm $k$ (shown in dotted lines at $k'$, Fig. 2) which at its end carries a spring latch $m$ preferably constructed of the construction shown in cross-section in Fig. 1; that is to say, it comprises a spring-pressed tapered or conical head which is pressed toward an arc-shaped flange $p$ on the neck A' so that in the open and shut positions of the valve respectively it enters one or other of two notches $q$, $q'$ (Fig. 6) formed in this arc-shaped flange. The universal joint G has its middle member $h$ connected to the member $g$ by a pin $r$, and to the member $i$ by a pin $s$, as usual in such joints. The result is that when, through the universal joint, movement is applied to the spindle E to open or close the valve, the locking arm $j$, $k$, is moved between the position shown in full and dotted lines in Figs. 1 and 2, and at the end of this movement the latch $m$ snaps into one of the recesses $q$ or $q'$ and holds the spindle in the position to which it has been turned, thus securely holding the valve plunger in its open or closed position.

Figure 4:
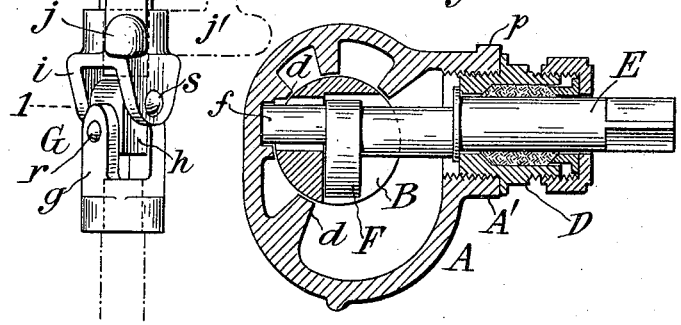
Fig. 4 is an oblique transverse section in the plane of the axis of the operating spindle, as indicated by the line 4—4 in Fig. 3.

The oblique arrangement of the valve plunger B and the valve seat $c$ is of advantage in affording an easy passage for the flow of the steam through the valve shell, which thus serves the purpose of a quarter bend pipe connection as well as a valve. The cross-section Fig. 4 shows the ample space allowed for the flow of the steam around the plunger valve. Such easy flow is desirable because the steam is flowing practically continuously through the valves of the entire train, except the one valve at the end of the train, which is closed; and any serious obstacle to the flow of the steam, especially in a long train where the steam has to traverse numerous end valves in succession, would materially diminish the pressure of the steam in cold weather before reaching the rear cars of the train.

Figure 1:
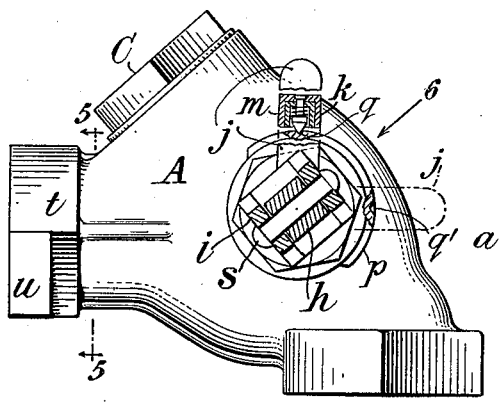
Figure 1 is a side elevation, partly in vertical section, in the plane of the line 1—1 in Fig. 2.
Figure 2:
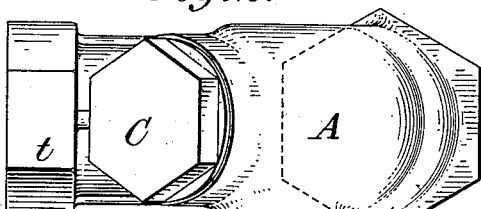
Fig. 2 is a plan view.
Figure 5:
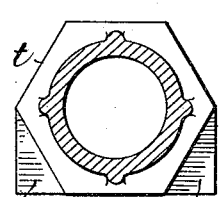
Fig. 5 is a transverse section of the neck of the valve on the line 5—5 in Fig. 1.

At the train pipe opening *a* the valve shell is formed with a hexagon *t* which on its lower side is broadened at *u*, as shown in Figs. 1 and 5, to provide a wide seat, so that this end of the valve shell may be supported upon some appropriate part of the ironwork beneath the car platform.

What I claim is:

1. An end train pipe valve comprising a casing having a horizontal inlet and a downwardly-disposed outlet, with an oblique passage between, and with an oblique valve seat and obliquely-arranged guides, a plunger valve movable obliquely against said seat and guided by said guides, and an operating spindle having a projecting portion engaging and operating said plunger valve.

2. A valve according to claim 1, its casing having a horizontally-projecting neck carrying a stuffing box for the valve spindle, said neck formed with an arc-shaped flange, and an arm carried by the valve spindle having a latch riding on said flange and engaging recesses therein to hold the valve open or closed.

3. An end train pipe valve having an operating spindle projecting out through the valve casing, and a universal joint for turning said spindle, one member of said joint having non-rotative engagement with the spindle, said member formed with an arm, and the valve casing formed with an arc-shaped flange having notches, and a spring latch carried by said arm and adapted to engage in said notches in the open and closed positions of the valve.

In witness whereof, I have hereunto signed my name.

JACOB O. BRUMBAUGH.

CERTIFICATE OF CORRECTION.

Patent No. 1,738,690.  Granted December 10, 1929, to

JACOB O. BRUMBAUGH.

It is hereby certified that the State of Incorporation of the assignee in the above numbered patent was erroneously given as "Ohio" whereas said State should have been given as "New York", as shown by the records of assignments in this office; and that the said Letters Patent should be read with this correction therein that the same may conform to the record of the case in the Patent Office.

Signed and sealed this 14th day of January, A. D. 1930.

(Seal)

M. J. Moore,
Acting Commissioner of Patents.